US010013064B2

(12) United States Patent
Keller et al.

(10) Patent No.: US 10,013,064 B2
(45) Date of Patent: *Jul. 3, 2018

(54) HAPTIC SURFACE WITH DAMPING APPARATUS

(71) Applicant: Oculus VR, LLC, Menlo Park, CA (US)

(72) Inventors: Sean Jason Keller, Kirkland, WA (US); Tristan Thomas Trutna, Seattle, WA (US); Ravish Mehra, Redmond, WA (US); Christoph Omid Hohnerlein, Berlin (DE); Elia Gatti, Redmond, WA (US); Riccardo DeSalvo, Pasadena, CA (US); David R. Perek, Bellevue, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,060

(22) Filed: Oct. 19, 2017

(65) Prior Publication Data
US 2018/0059795 A1 Mar. 1, 2018

Related U.S. Application Data

(63) Continuation of application No. 15/274,984, filed on Sep. 23, 2016, now Pat. No. 9,851,799.

(60) Provisional application No. 62/232,815, filed on Sep. 25, 2015, provisional application No. 62/232,824, filed on Sep. 25, 2015.

(51) Int. Cl.
G05B 23/02 (2006.01)
H04B 3/36 (2006.01)
G09G 5/00 (2006.01)
G06F 3/01 (2006.01)
G08B 6/00 (2006.01)
G06T 19/00 (2011.01)

(52) U.S. Cl.
CPC .............. G06F 3/016 (2013.01); G06F 3/011 (2013.01); G06T 19/006 (2013.01); G08B 6/00 (2013.01)

(58) Field of Classification Search
None
See application file for complete search history.

(56) References Cited

U.S. PATENT DOCUMENTS 5,913,727 A 6/1999 Ahdoot
RE37,528 E 1/2002 Hannaford et al.
(Continued)

OTHER PUBLICATIONS

Armel, K.C. et al., "Projecting Sensations to External Objects: Evidence from Skin Conductance Response," Proceedings of the Royal Society of London B: Biological Sciences, 2003, pp. 1499-1506, vol. 270.

(Continued)

Primary Examiner — Emily C Terrell
(74) Attorney, Agent, or Firm — Fenwick & West LLP

(57) ABSTRACT

A haptic device configured to provide haptic feedback to a user. In one aspect, a user or part of a user is located on the haptic device including actuators and damping elements. A haptic feedback wave is generated by an actuator and propagated to the user or part of the user on the haptic device. Damping elements receive the haptic feedback wave and suppress the haptic feedback wave to reduce a reflection thereof.

18 Claims, 6 Drawing Sheets

(56) References Cited

U.S. PATENT DOCUMENTS

| | | | |
|---|---|---|---|
| 6,512,947 B2* | 1/2003 | Bartholome | A61B 5/02455 482/23 |
| 8,502,792 B2 | 8/2013 | Anastas et al. | |
| 2004/0133366 A1 | 7/2004 | Sullivan et al. | |
| 2005/0237314 A1 | 10/2005 | Ryynanen | |
| 2006/0209019 A1 | 9/2006 | Hu | |
| 2006/0232564 A1 | 10/2006 | Nishimura et al. | |
| 2008/0132313 A1 | 6/2008 | Rasmussen et al. | |
| 2009/0010468 A1 | 1/2009 | Oser et al. | |
| 2010/0308982 A1 | 12/2010 | Cooperstock et al. | |
| 2013/0002341 A1 | 1/2013 | Maier et al. | |
| 2013/0076652 A1 | 3/2013 | Leung | |
| 2013/0093577 A1 | 4/2013 | Park et al. | |
| 2013/0116852 A1 | 5/2013 | Dijk et al. | |
| 2013/0154813 A1 | 6/2013 | Gosline et al. | |
| 2017/0290432 A1* | 10/2017 | Reinhard | A47C 7/14 |

OTHER PUBLICATIONS

Baalman, M., "How to Control 840 Channels—Working with Large Scale Wave Field Synthesis," Next Generation 2007: Musik im Raum. ZKM—Institut fur Musik and Akustik, 2007, pp. 52-56.
Baalman, M.A.J., "On Wave Field Synthesis and Electro-Acoustic Music, with a Particular Focus on the Reproduction of Arbitrarily Shaped Sound Sources," Ph.D. Dissertation, University of Berlin, 2008, 267 pages.
Berkhout, A.J., "A Holographic Approach to Acoustic Control," Journal of the Audio Engineering Society, 1988, pp. 977-995, vol. 36, No. 12.
Bolanowski, S. J. et al., "Four Channels Mediate the Mechanical Aspects of Touch," The Journal of the Acoustical Society of America, Nov. 1988, 1680-1694, vol. 84, No. 5.
Boone, M.M., "Acoustic Rendering with Wave Field Synthesis," Proceedings of the ACM Siggraph and Euro Graphics Campfire: Acoustic Rendering for 'Virtual Environments, Snowbird, Utah, 2001, 9 pages.
Brandenburg, K. et al., "Wave Field Synthesis: From Research to Applications," 12th European Signal Processing Conference, IEEE, 2004, pp. 1369-1376.
Brink, M.C., "The Acoustic Representation of Bending Waves," M.Sc. Thesis, Laboratory of Acoustic Imaging and Sound Control, Delft University of Technology, 2002, 81 pages.
Chang, A. et al., "Audio-Haptic Feedback in Mobile Phones," CHI '05 Extended Abstracts on Human Factors in Computing Systems (CHI EA '05), ACM, New York, NY, USA, 2005, pp. 1264-1267.
Danieau, F. et al., "Framework for Enhancing video viewing experience with haptic effects of motion," IEEE Haptics Symposium (HAPTICS), 2012, pp. 541-546.
De Vries, D. et al., "Wave Field Synthesis and Analysis Using Srray Technology," 1999 IEEE Workshop on Applications of Signal Processing to Audio and Acoustics, IEEE, Oct. 17-20, 1999, pp. 15-18.
Diller, T.T., "Frequency Response of Human Skin in Vivo Io Mechanical Stimulation," Thesis, Massachusetts Institute of Technology, Feb. 2001, 85 pages.
Dindar, N. et al., "Immersive Haptic Interaction with Media," 2010 6 pages.
Dreyer, D.A., "Factors Influencing Cutaneous Directional Sensitivity," Sensory Processes Mar. 1978, pp. 71-79, vol. 2, No. 2.
Ertan, S. et al., "A Wearable Haptic Navigation Guidance System," Second International Symposium on Wearable Computers, Digest of Papers, IEEE, 1998, pp. 164-165.
Fohl, W., "The Wave Field Synthesis Lab at the HAW Hamburg," Sound-Perception-Performance, Springer, 2013, pp. 243-255.
Gardner, E.P. et al., "Discrimination of the Direction of Motion on the Human Hand: a Psychophysical Study of Stimulation Parameters," Journal of Neurophysiology Jun. 1994, pp. 2414-2429, vol. 71, No. 6.
Gautier, F. et al, "Experimental Investigation of the Acoustic Black Hole Effect for Vibration Damping in Elliptical Plates," Journal of the Acoustical Society of America, Acoustics '08, Jun. 29-Jul. 4, 2008, p. 3318, vol. 123, No. 5.
Gaw, D. et al., "Haptically Annotated Movies: Reaching Out and Touching the Silver Screen," 14th Symposium on Haptic Interfaces for Virtual Environment and Teleoperator Systems, Mar. 25-26, 2006, pp. 287-288.
Gleeson, B.T. et al., "Communication of Direction Through Lateral Skin Stretch at the Fingertip," Third Joint EuroHaptics Conference and Symposium on Haptic interfaces for Virtual Environment and Teleoperator Systems. World Haptics, Mar. 18-20, 2009, pp. 172-177.
Goertz, A. et al., "Entwicklung eines achtkanaligen Lautsprechermoduls fur die Wellenfeldsynthese," DAGA 2007, Stuttgart, 2007, pp. 681-682. [with machine translation].
Hohnerlein, C., "Coloration of Virtual Sources in Wave Field Synthesis for Different Loudspeaker Spacings," Bachelor's Thesis. Technical University of Berlin, Nov. 4, 2013, 56 pages.
Hoshi, T. et al., "Noncontact Tactile Display Based on Radiation Pressure of Airborne Ultrasound," IEEE Transactions on Haptics, Jul.-Sep. 2010, pp. 155-165, vol. 3, No. 3.
Israr, A. et al., "Control Space of Apparent Haptic Motion," World Haptics Conference (WHC), 2011 IEEE, IEEE, pp. 457-462.
Jack, R. et al., "Designing Tactile Musical Devices with and for Deaf Users: a Case Study," Proceedings of the International Conference on the Multimodal Experience of Music, 2015, 7 pages.
Johansson, R.S. et al., "Responses of Mechanoreceptive Afferent Units in the Glabrous Skin of the Human Band to Sinusoidal Skin Displacements," Brain Research, 1982, pp. 17-25, vol. 244, No. 1.
Kaltenbranner, M. et al., "The reactable: A Collaborative Musical Instrument," 15th IEEE International Workshops on Enabling Technologies: Infrastructure for Collaborative Enterprises, WETICE'06, IEEE, 2006, pp. 406-411.
Kirman, J.H., "Tactile Apparent Movement: The Effects of Interstimulus Onset Interval and Stimulus Duration," Perception and Psychophysics, 1974, pp. 1-6, vol. 15, No. 1.
Krylov, V.V. et al. "Acoustic 'Black Holes' for Flexural Waves as Effective Vibration Dampers," Journal of Sound and Vibration, 2004, pp. 605-619, vol. 274, No. 3.
Krylov, V.V., "Acoustic Black Holes: Recent Developments in the Theory and Applications," IEEE Transactions on Ultrasonics, Ferroelectrics, and Frequency Control, Aug. 2014, pp. 1296-1306, vol. 61, No. 8.
Kyung, K-U. et al., "Perceptual and Biomechanical Frequency Response of Human Skin: Implication for Design of Tactile Displays," Proceedings of the First Joint Eurohaptics Conference and Symposium on Haptic Interfaces for Virtual Environment and Teleoperator Systems, IEEE, 2005, pp. 96-101.
Lemmens, P., "A Body-Conforming Tactile Jacket to Enrich Movie Viewing," Third Joint EuroHaptics Conference and Symposium on Haptic interfaces for Virtual Environment and Teleoperator Systems, World Haptics, Mar. 18-20, 2009, pp. 7-12.
Makino, Y. et al., "HaptoClone (Haptic-Optical Clone): Mid-air Haptic-Optical Human-Human Interaction with Perfect Synchronization," Proceedings of the 3rd ACM Symposium on Spatial User Interaction, SUI 2015, ACM, Aug. 8-9, 2015, p. 139.
Malgoezar, A.N.M., "Reflection and Transmission of Plane Acoustic Waves on a Nonlinear Interface," Master Thesis, Delft University of Technology, 2012, 61 pages.
Marquardt, N. et al., "The Haptic Tabletop Puck: Tactile Feedback for Interactive Tabletops," Proceedings of the ACM International Conference on Interactive Tabletops and Surfaces, ACM, 2009, pp. 85-92.
Morioka, M. et al., "Perception Thresholds for Vertical Vibration at the Hand, Seat and Foot," Proceedings of the European Acoustic Association from Acusticum, 2005, pp. 1577-1582.
Muller, S. et al., "Transfer-Function Measurement with Sweeps," Journal of the Audio Engineering Society, Jun. 2001, pp. 443-471, vol. 49, No. 6.
Nanayakkara, S.C. et al., "Enhancing Musical Experience for the Hearing-Impaired Using Visual and Haptic Displays," Human-Computer Interaction, 2013, pp. 115-160, vol. 28, No. 2.

(56) References Cited

OTHER PUBLICATIONS

Norrsell, U. et al., "Human, Tactile, Directional Sensibility and its Peripheral Origins," Acta physiologica Scandinavica, Feb. 1992, pp. 155-161, vol. 144, No. 2.

Okamura, A.M. et al., J. "Vibration Feedback Models for Virtual Environments," Proceedings. 1998 IEEE International Conference on Robotics and Automation, 1998, p. 674-679, vol. 1.

Olausson, H., "The Influence of Spatial Summation on Human Tactile Directional Sensibility," Somatosensory & motor research, 1994, pp. 305-310, vol. 11, No. 4.

PCT International Search Report and Written Opinion, PCT Application No. PCT/US2016/053561, dated Jan. 17, 2017, 12 pages.

Puckette, M.S. et al., "Real-Time Audio Analysis Tools for Pd and MSP," 1998, 4 pages.

Ryu, J. et al., "A Survey of Haptic Control Technology," Transactions of the Korean Society of Mechanical Engineers, 2009, pp. 283-295, vol. 33, No. 4.

Schirmer, M. et al., "Shoe me the Way: A Shoe-Based Tactile Interface for Eyes-Free Urban Navigation," Proceedings of the 17th international Conference on Human-Computer Interaction with Mobile Devices and Services, MobileHCI'15, ACM, Aug. 24-27, 2015, pp. 327-336.

Schlee, G., "Quantitative Assessment of Foot Sensitivity: The Effects of Foot Sole Skin Temperature, Blood Flow at the Foot Area and Footwear," Doctoral Thesis, Chemnitz University of Technology, Apr. 2010, 95 pages.

Sharma, A., Lechal: A Haptic Feedback Based Navigation Shoe (for the blind), 2011, 6 pages, May be retrieved at<URL:http://anirudh.me/2011/06/le-chal-a-haptic-feedback-based-shoe-for-the-blind/>.

Smith, J. et al., "Communicating EmotionThrough a Haptic Link: Design Space and Methodology," International Journal of Human-Computer Studies, 2007, pp. 376-387, vol. 65, No. 4.

Sodhi, R. et al., "Aireal: Interactive Tactile Experiences in Free Air," ACM Transactions on Graphics (TOG), 2013, pp. 134:1-134:10, vol. 32, No. 4.

Spors, S. et al., "The Theory of Wave Field Synthesis Revisited," 124th Convention of the Audio Engineering Society, May 17-20, 2008, 11 pages.

Spors, S. et al., "Physical and Perceptual Properties of Focused Sources in Wave Field Synthesis," 127th Audio Engineering Society Convention, 2009, pp. 1036-1054.

Spors, S.M., "Active Listening Room Compensation for Spatial Sound Reproduction Systems," Ph.D. Dissertation, University of Erlangen-Nurenberg, 2005, 293 pages.

Talbot, W. H., "The Sense of Flutter-Vibration: Comparison of the Human Capacity with Response Patterns of Mechanoreceptive Afferents from the Monkey Hand ," Journal of Neurophysiology, 1968, pp. 301-334, vol. 31, No. 2.

Tan, H.Z. et al., "A Haptic Back Display for Attentional and Directional Cueing," Haptics-e, Jun. 2003, pp. 1-20, vol. 3, No. 1.

Weiss, M. et al., "FingerFlux: Near-Surface Haptic Feedback on Tabletops," Proceedings of the $24^{th}$ Annual ACM Symposium on User Interface Software and Technology, UIST'11, ACM, Oct. 16-19, 2011, pp. 615-620.

Wierstorf, H. et al., "Sound Field Synthesis Toolbox," 132nd Convention of the Audio Engineering Society, 2012, 4 pages.

Witmer, B.G. et al., "Measuring Presence in Virtual Environments: A Presence Questionnaire," Presence, 1998, pp. 225-240, vol. 7, No. 3.

Yannier, N. et al., "FeelSleeve: Haptic Feedback to Enhance Early Reading," In Proc. of CHI 2015, ACM, Apr. 18-23, 2015, 10 pages.

Zhao, S. et al., "Intermanual Apparent Tactile Motion on Handheld Tablets," 2015 IEEE World Haptics Conference (WHC), IEEE, Jun. 22-26, 2015, pp. 241-247.

United States Office Action, U.S. Appl. No. 15/274,984, dated May 4, 2017, 14 pages.

United States Office Action, U.S. Appl. No. 15/275,112, dated Apr. 27, 2017, 15 pages.

* cited by examiner

US 10,013,064 B2

HAPTIC SURFACE WITH DAMPING APPARATUS

CROSS REFERENCE TO RELATED APPLICATIONS

This application is a continuation of U.S. patent application Ser. No. 15/274,984 filed Sep. 23, 2016, which claims priority to and the benefit of U.S. Provisional Patent Application No. 62/232,815 filed on Sep. 25, 2015, and U.S. Provisional Patent Application No. 62/232,824 filed on Sep. 25, 2015, both of which are incorporated by reference in their entirety.

BACKGROUND

The present disclosure generally relates to a system for presenting a virtual reality experience to a user, and specifically to a surface for providing controlled haptic effects to a user on the surface.

Haptic feedback is a use of vibrations patterns and waveforms to provide information to a user. For example, when a user touches a certain region of a surface of a touch screen display, the surface of the touch screen display can be vibrated to notify the region of the touch screen display is touched. For another example, a user may be placed on a surface of a mat, and a vibration wave can be propagated from one side of the surface of the mat toward the user. However, the vibration wave can be scattered and reflected back to the user thereby reducing the user's perception of haptic feedback.

SUMMARY

Embodiments relate to a haptic device that can provide a haptic feedback to a user with reduced reflection thereof. The haptic device may be a plate or a mat, and they may be sized for a user to stand on, or alternatively for a user to place his/her hand upon. In one or more embodiments, the haptic device includes a center plate; an actuator coupled to the center plate, and a periphery section that circumscribes the center plate. The actuator is configured to generate a wave directed towards a center of the center place. The periphery section is coupled to a damping element. The damping element is configured to receive the wave exiting the center plate and is further configured to suppress the wave to reduce reflections of the wave toward the center plate. The wave may be a haptic feedback wave for providing the haptic feedback to the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments relate to a system and a method for providing haptic feedback to a user and reducing the reflection of the haptic feedback. In one aspect, a user or part of a user (e.g., user's hand) is located on a haptic device (e.g., haptic mat) including actuators and damping elements. A haptic feedback wave is generated by an actuator and propagated to the user or part of the user on the haptic mat. Damping elements receive the haptic feedback wave and suppress the haptic feedback wave to reduce a reflection thereof.

In one embodiment, the damping elements include a passive damping element, an active damping element, or a combination of both. A passive damping element herein refers to a shape or a pattern of the haptic mat that causes the haptic feedback wave to converge. An active element herein refers to an electrical, a mechanical or a magnetic component that presses and depresses the haptic mat to reduce the reflection of the haptic feedback wave.

In one aspect, the haptic mat is implemented in a virtual reality system for providing virtual reality experience to a user. The virtual reality system includes a display for presenting an image of the virtual world to the user and the haptic mat with damping elements for providing haptic feedback to the user with reduced reflection. The virtual reality system updates the image of the virtual world according to a user's movement, so that the user can visually experience the virtual world. In addition, the virtual reality system provides haptic feedback to a user that the user can sense in conjunction with the 3-D image of the virtual world to amplify the virtual reality experience. A haptic mat including damping elements can provide haptic feedback in a controlled direction. Hence, the user can determine the direction of the haptic feedback and enjoy a better immersive virtual reality experience.

System Overview

Figure 1:
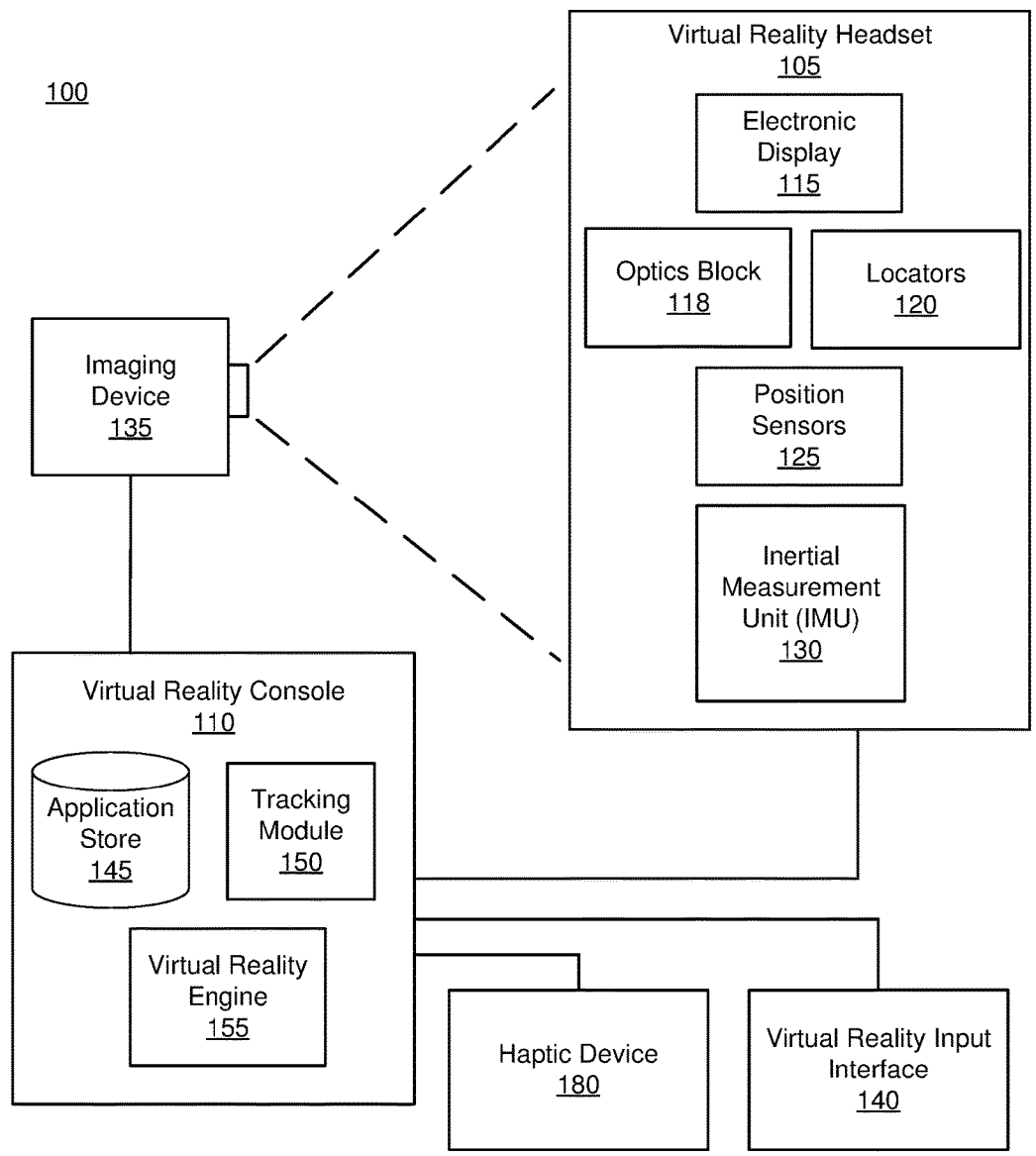
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, a VR input interface 140, and a haptic device 180 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100. Similarly, the functions can be distributed among the components in a different manner than is described here. For example, some or all of the functionality of the VR console 110 may be contained within the VR headset 105.

The VR headset 105 is a head-mounted display that presents media to a user. Examples of media presented by the VR head set include one or more images, video, audio, or any combination thereof. In some embodiments, audio is presented via an external device (e.g., speakers and/or headphones) that receives audio information from the VR headset 105, the VR console 110, or both, and presents audio data based on the audio information.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request.

The haptic device 180 is a device configured to provide haptic feedback to the user. The haptic device 180 is operated according to commands from the VR console 110. Specifically, the haptic device 180 provides actuation that a user can sense, in accordance with the image presented on the VR headset 105. For example, the haptic device 180 vibrates in response to the user encountering an object in a virtual world. The haptic device 180 can be a haptic mat, for example having a diameter larger than 3 feet such that a user can be located on, as described in detail with respect to FIG. 2. In other embodiments, the haptic device 180 has a smaller form factor, for example with a diameter less than 18 inches, and is configured to provide haptic feedback to a hand of the user. In some embodiments, the haptic device 180 can be implemented for providing haptic feedback in an augmented reality.

The VR console 110 provides media to the VR headset 105 for presentation to the user in accordance with information received from one or more of: the imaging device 135, the VR headset 105, and the VR input interface 140. The VR console 110 may also instruct the haptic device 180 (e.g., haptic mat) to provide haptic feedback. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR input interface 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 150 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. In one example, the VR engine 155 instructs the VR headset 105 to provide visual or audible feedback to the user. In another example, the VR engine 155 instructs the haptic device 180 (e.g., haptic mat) to provide haptic feedback to the user.

Example Virtual Reality System

Figure 2:
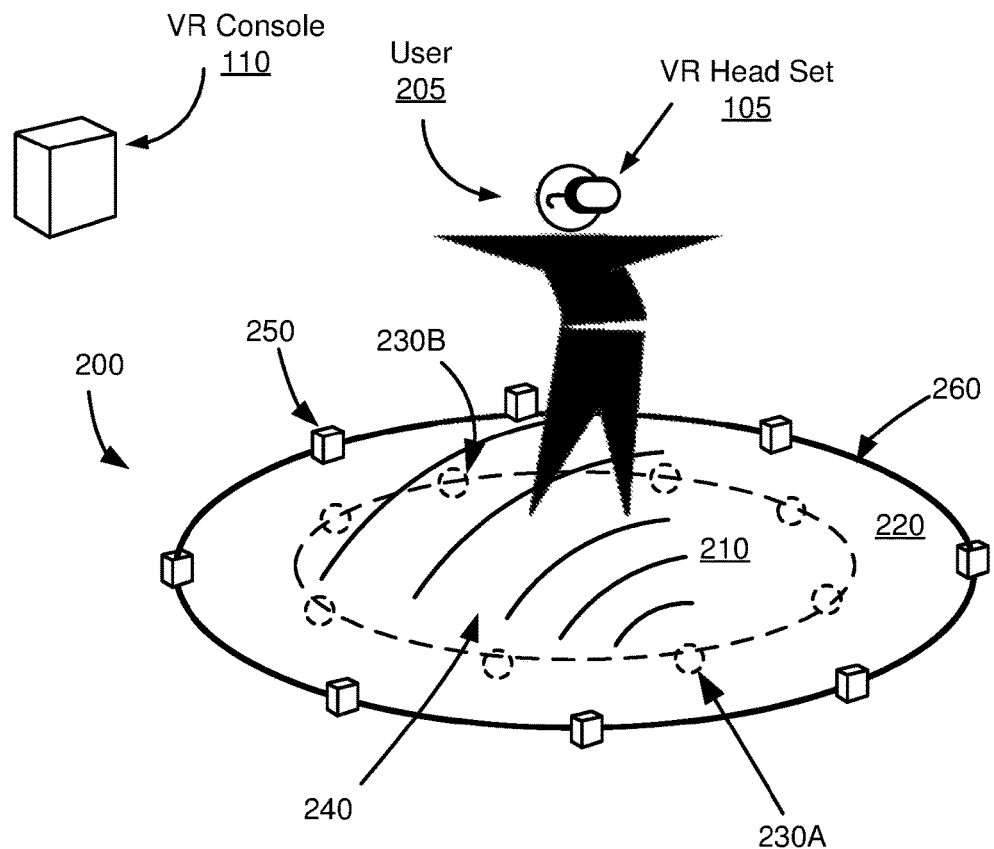
FIG. 2 is a diagram of a user on a haptic mat of the virtual reality system including actuators and damping elements, in accordance with an embodiment.

FIG. 2 is an example diagram of a user 205 on a haptic mat 200 of the virtual reality system 100, in accordance with an embodiment. In some embodiments, the haptic mat 200 may be, e.g., the haptic device 180. The user 205 wears the VR headset 105 and views an image of the virtual world provided from, e.g., the VR console 110, as described in detail with respect to FIG. 1. The haptic mat 200 provides haptic feedback to the user 205 located on the haptic mat 200 in accordance with the image presented on the VR headset 105.

The haptic mat 200 is a surface that provides controlled haptic feedback to a user 205 on the haptic mat 200 according to a control from the VR console 110. The haptic mat 200 includes a center plate 210, a periphery section 220 circumscribing the center plate 210, actuators 230, and damping elements 250. In one example, an edge (or a contour) of the haptic mat 200 is an edge 260 (or a contour) of the periphery section 220 away from the center plate 210.

The center plate 210 transmits haptic feedback from the haptic mat 200 to the user 205. The center plate 210 may have a circular, elliptical, or some other shape useful for transmitting haptic feedback. The user 205 can be placed on the center plate 210 to receive the haptic feedback. Haptic feedback can be provided from one side of the haptic mat 200 toward another side of the haptic mat 200 through the center plate 210. Preferably, the center plate 210 is rigid such that a haptic feedback wave 240 generated by one or more of the actuators 230 can be propagated through the center plate 210. The center plate 210 is composed of, e.g., aluminum, steel, stainless steel, some other metal, some other material with a stiffness over N/m, or some combination thereof.

In some embodiments, the haptic map 200 generates haptic feedback via wave field synthesis. Huygens' principle proposes that a singular wavefront can be thought of as a distribution of point sources, whose radial emission of energy through superposition overlay to exactly that wavefront. Using this idea, the haptic mat 200 is able to generate waves of a particular frequency by driving the actuators 230 with a specific phase delay (e.g., depending on array geometry of the actuators 230). Additional details of an example haptic mat are discussed in the Appendix.

The actuators 230 are coupled to the center plate 210 of the haptic mat 200 and provide haptic feedback to the user 205. In one aspect, the actuators 230 are coupled to a bottom surface of the center plate 210, near a perimeter of the center plate 210. The actuators 230 have limited movement within 6 degrees of freedom. For example, the actuators 230 may move forward/backward, up/down, left/right (translation in three perpendicular axes) combined with rotation about three perpendicular axes (i.e., pitch, yaw, and roll). The actuators 230 are electrically actuated to induce motion in the center plate 210 in accordance with commands from the VR console 110 to generate a haptic feedback wave 240. In some embodiments, some or all of the actuators 230 may also be configured to dampen a haptic feedback wave. For example, In FIG. 2, an actuator 230A may generate the haptic feedback wave 240, and one or more other actuators 230 (e.g., actuator 230B) may be configured to actively dampen the haptic feedback wave 240.

In some embodiments, the periphery section 220 circumscribing the center plate 210 is coupled to one or more damping elements 250. The damping elements 250 on the periphery section 220 receive the haptic feedback wave 240 generated by one or more of the actuators 230 and suppress the haptic feedback wave 240. The damping elements 250 may be passive elements, active elements, or a combination of thereof. Without damping (e.g., via the damping elements 250) the haptic feedback wave 240 generated from one side of the periphery section 220 propagates through the user 205 on the center plate 210 to reach the edge 260 of the periphery section 220, and can be reflected back to the user 205. The reflected wave can interfere with the haptic feedback wave 240, thereby reducing the user's perception of haptic feedback or direction of the haptic feedback. By implementing the damping elements 250, reflections of the haptic feedback wave can be reduced.

Figure 3:
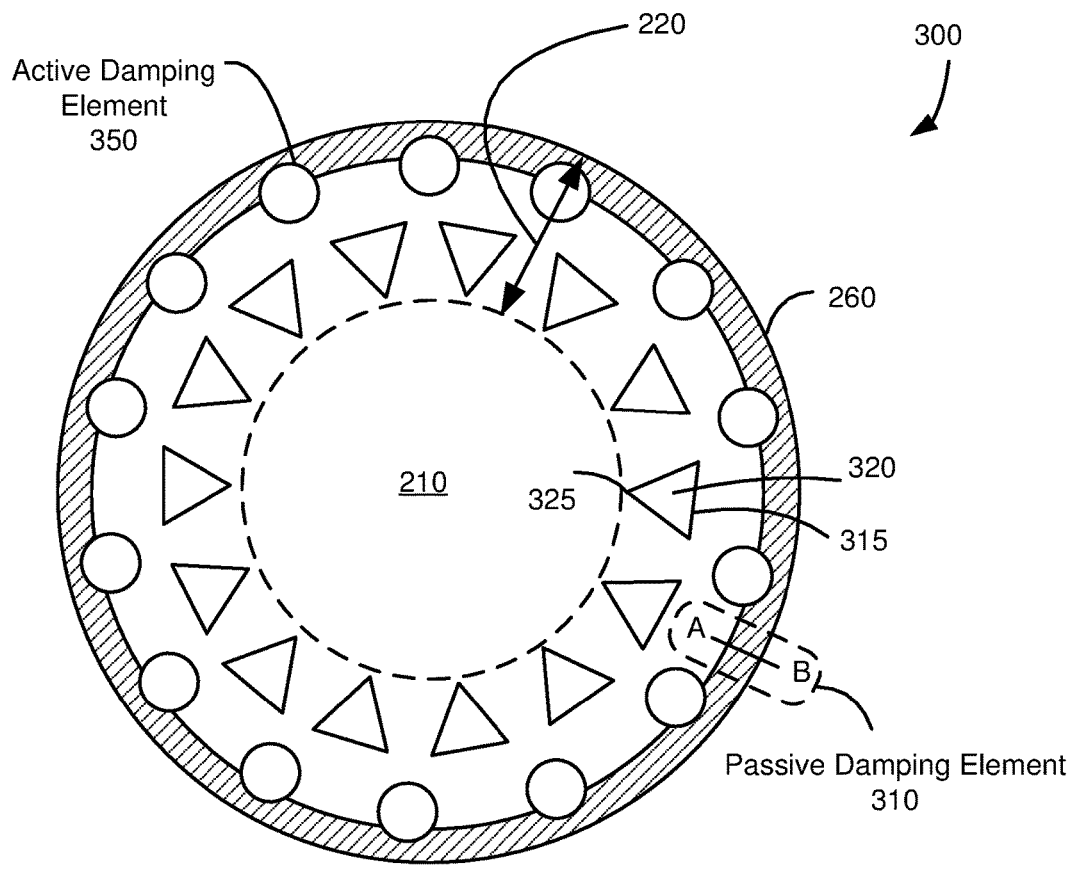
FIG. 3 is a top plan view of an example haptic mat with various damping elements, in accordance with an embodiment.

FIG. 3 is a top plan view of an example haptic mat 300 with various damping elements, in accordance with an embodiment. In some embodiments, the haptic mat 300 is, e.g., the haptic mat 200. Actuators (like, e.g., actuators 230) are not shown in FIG. 3, for simplicity. In one embodiment, the haptic mat 300 includes passive damping elements 310 and 320, and active damping elements 350 on a periphery section 220. These damping elements operate to reduce reflections of haptic feedback waves from the center plate 210 back to the center plate 210. In other embodiments, the haptic mat 200 includes different, more or less damping elements.

The passive damping element 310 is disposed on the periphery section 220 on the circumference of the haptic mat 200. The passive damping element 310 has a specific shape to reduce the haptic feedback wave entering. For example, the passive damping element 310 has a shape of a funnel or a variation of it, where the thickness of the passive damping element 310 toward the center plate 210 is thicker than toward an edge 260 of the haptic mat 300, as described in detail with respect to FIG. 4A. The passive damping element 310 receives the haptic feedback wave from the center plate 210, and converges the haptic feedback wave toward an outer end of the periphery section 220 (or an end of the haptic mat 200). The converged haptic feedback wave can be effectively suppressed to reduce any reflection thereof.

The passive damping element 320 is a portion of the haptic mat 200 on the periphery section 220 that is configured to reduce the amplitude of a haptic feedback wave. In one aspect, the passive damping element 320 is located on the top surface of the haptic mat 200 between the passive damping element 310 and the center plate 210. The passive damping element 320 may be, e.g., a cut-out portion of the periphery section 220, a material that attenuates or reflects propagation of a haptic feedback wave (e.g., foam), or some combination thereof. The passive damping element 320 attenuates or reflects haptic waves incident upon them regardless of the waves direction of propagation.

The active damping elements 350 are components that press and depress the periphery section 220 of the haptic mat 200 to suppress the haptic feedback wave. The active damping elements 350 are placed between the passive damping elements 310 and the passive damping elements 320. Alternatively, the active damping elements are placed after the passive damping elements 310 and 320 away from the center plate 210. In one embodiment, the active damping elements 350 operate in a similar manner as the actuators 230, and may operate together to suppress reflections of haptic feedback waves.

In one aspect, one or more of the active damping elements 350 react to the haptic feedback wave. The active damping elements 350 detect a haptic feedback wave entering. Responsive to detecting the haptic feedback wave, the active damping elements 350 press and depress the haptic mat 200 to suppress the haptic feedback wave and to reduce any reflections thereof.

In another aspect, the active damping elements 350 operate according to the VR console 110 to suppress the haptic feedback wave. Specifically, the VR console 110 predicts when the haptic feedback wave will reach the active damping elements 350, and causes the active damping elements 350 to press or depress the haptic mat 200 at the predicted time to suppress the haptic feedback wave.

Figure 4A:
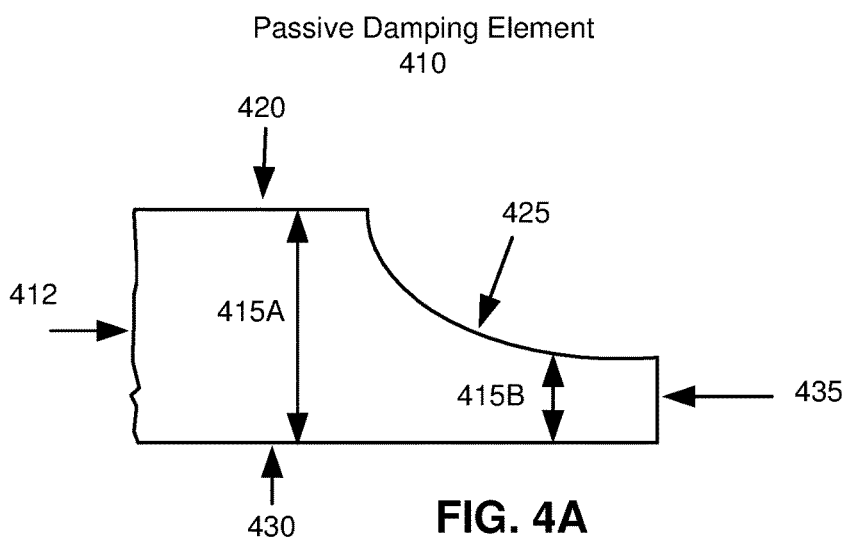
FIG. 4A is a cross section diagram of a line A-B to illustrate a passive damping element of a portion of the haptic mat of FIG. 3, in accordance with an embodiment.

FIG. 4A is a cross-sectional diagram of an example passive damping element 410 across a line A-B in FIG. 3. In some embodiments, the passive damping element 410 is, e.g., the passive damping element 310 of FIG. 3. In one implementation, the passive damping element 410 includes an entrance 412, a first top surface 420, a second top surface 425, a bottom surface 430, and a termination 435. In some embodiments, the entrance 412 is coupled to the center plate 210, and the termination 435 is an edge 260 of the haptic mat 300 or periphery section 220. The haptic feedback wave can enter the entrance 412 from the center plate 210, and propagates within the passive damping element 410 toward the termination 435 at which the haptic feedback wave is attenuated.

As shown in FIG. 4A, the second top surface 425 of the passive damping element 410 is tapered off toward the termination 435. Hence, a height 415A (or thickness) between the first top surface 420 and the bottom surface 430 is higher than a height 415B (or thickness) between the second top surface 425 and the bottom surface 430. Because the height of the passive damping element 310 is reduced toward the termination 435, energy of the haptic feedback wave is converged at the end of the passive damping element 310 and may be dissipated. In one embodiment, dampening material (e.g., foam or recoil mass) is coupled to the passive damping element 310 to effectively suppress the concentrated haptic feedback wave. For example, the dampening material can be coupled to the termination 435.

Figure 4B:
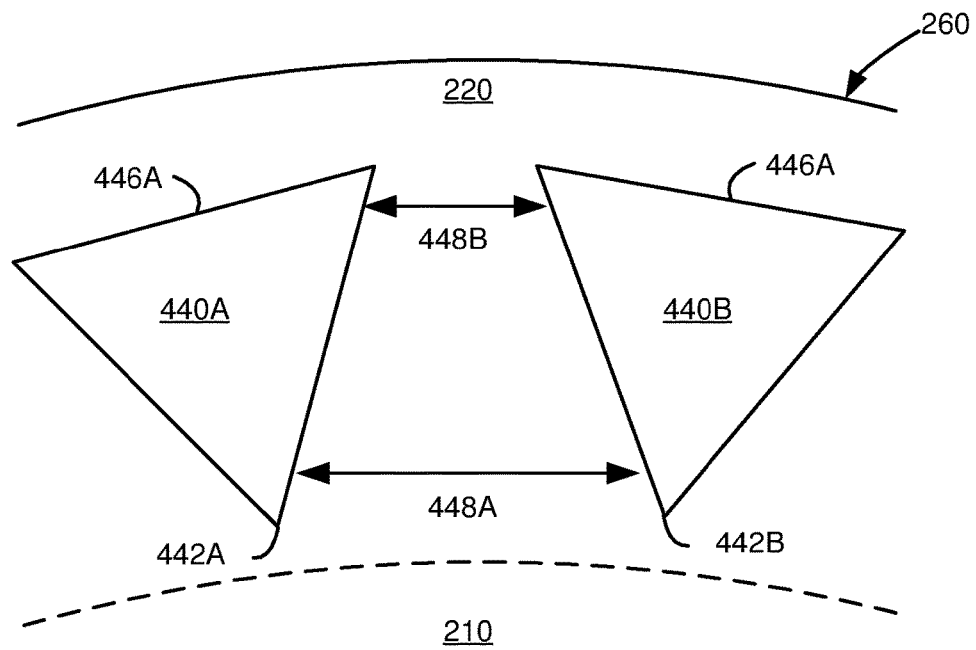
FIG. 4B is a blown up diagram of a portion of the haptic mat of FIG. 3 to illustrate another passive damping element, in accordance with an embodiment.

FIG. 4B is a blown up diagram of a portion of the haptic mat 300 of FIG. 3 including two passive damping elements 440A and 440B, in accordance with an embodiment. The two passive damping elements 440A and 440B are disposed on the periphery section 220. Each passive damping element 440 has a triangular shape or a shape substantially similar to a triangular shape with a respective vertex 442 toward the center plate 210 and a side 446 away from the vertex 442. In some embodiments, each of the passive damping elements 440A and 440B is, e.g., the passive damping element 320 of FIG. 3. In one aspect, the passive damping elements 440A and 440B receive a haptic feedback wave and attenuate the received haptic feedback wave. In another aspect, the passive damping elements 440A and 440B reflect the haptic feedback wave in a manner that energy of the haptic feedback from the center plate 210 is converged as the haptic feedback wave propagates through a space 448 between the two passive damping elements 440A and 440B toward the edge 260 of the periphery section 220.

In one aspect, the space 448 between the two passive damping elements 440A and 440B are non uniform. Specifically, the space 448A between two damping elements near the center plate 210 is larger than the space 448B between two damping elements away from the center plate 210. Because the passive damping elements 440A and 440B reflect the haptic feedback incident upon, the haptic feedback wave entering the space 448A near the center plate 210 is converged when passing through the space 448B away from the center plate. Accordingly, the haptic feedback wave propagating between two passive damping elements 440A and 440B from the center plate 210 converges. The converged haptic feedback wave exiting the spacing 448 between the passive damping elements 320 can be effectively suppressed by the active damping element 350 or other components.

Figure 4C:
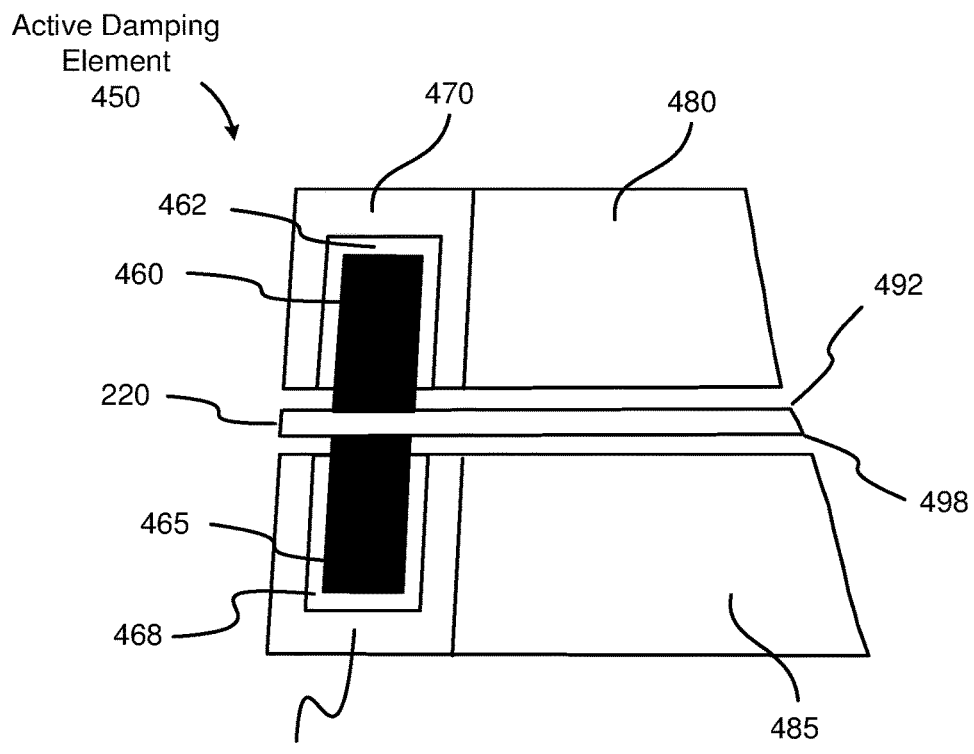
FIG. 4C is a diagram of an active damping element, in accordance with an embodiment.

FIG. 4C is a diagram of an active damping element 450, in accordance with an embodiment. In some embodiments, the active damping element 450 is, e.g., the active damping element 350 of FIG. 3. The active damping element 450 includes a first magnet 460, a second magnet 465, a first coil cover 470, and a second coil cover 475. In alternative configurations, different, additional and/or less components may be included in the active damping element 450.

The first magnet 460 is placed on a top surface 492 of the periphery section 220 coupled to the center plate 210. The first magnet 460 is surrounded by a first coil cover 470, except a surface of the first magnet 460 facing the top surface of the periphery section 220. Spacing 462 (e.g., air gap) between the first magnet 460 and the first coil cover 470 is provided to allow the first magnet 460 to move in accordance with magnetic field applied. The coil cover 470 includes a coil (not shown) wound parallel to the top surface of the periphery section 220. Depending on current flowing through the coil in the coil cover 470, a corresponding magnetic field is applied to the magnet 460, thus the magnet 460 can be configured to press or depress the periphery section 220 of the haptic mat 200. In one aspect, the current is generated responsive to the haptic feedback wave received by the active damping element 350. In another aspect, the current is supplied by the VR console 110 or another component operating in accordance with the VR console 110.

The second magnet 465 is placed on a bottom surface 498 of the periphery section 220 facing away from the top surface 492. The second magnet 465 is surrounded by the second coil cover 475 except a surface of the second magnet 465 facing the bottom surface 498. Spacing 468 (e.g., air gap) between the second magnet 465 and the second coil cover 475 is provided to allow the second magnet 465 to move in accordance with magnetic field applied. The configuration and operation of the second magnet 465 and the second coil cover 475 are substantially similar to the first magnet 460 and the first coil cover 470. Therefore, detailed description thereof is omitted herein for the sake of brevity.

In one aspect, the coils can be connected to an amplifier with a negative resistance to improve damping. Specifically, the amplifier with the negative resistance connected to a coil in series can reduce the effective resistance of the coil with the amplifier close to near zero, and enhance damping effect.

In some embodiments, the active damping element 450 detects the haptic feedback wave and suppresses the haptic feedback wave responsive to detecting the haptic feedback wave. For example, when there is no haptic feedback wave detected, the first magnet 460 is placed on the top surface of the periphery section 220 and the second magnet 465 is placed on the bottom surface of the periphery section 220. When the haptic feedback wave reaches the magnets 460, 465, the magnets 460, 465 move and become separated from the periphery section 220 of the haptic mat 200 because of the vibration of the haptic feedback wave. The movements of the magnets 460, 465 cause changes in the magnetic fields through the coils, and induce eddy current on the coils. The eddy current then generates counter magnetic fields against the change in the magnetic fields causing the magnets to recoil. Hence, the magnets 460, 465 press and depress the haptic mat 200, according to the haptic feedback wave detected.

In some embodiments, the active damping element 450 is operated according to the VR console 110 that causes an actuator 230 to generate the haptic feedback wave. Specifically, the VR console 110 predicts when the haptic feedback wave transmitted from the actuator 230 will reach a particular active damping element 450, and causes that active damping element 450 to suppress the predicted haptic feedback wave. The VR console 110 can provide current to the coils or control a current supply device to provide current to the coils, and cause the magnets 460, 465 to press and depress the haptic mat 200 when the haptic feedback wave is expected to arrive.

In some embodiments, one or more actuators 230 operate in a similar manner as the active damping elements 450. Specifically, the one or more actuators 230 can press and depress the center plate 210 responsive to detecting a haptic feedback wave at the one or more actuators 230 or responsive to a command from the VR console 110 at a predicted time the feedback wave is expected to arrive. Hence, the active damping elements 450 can operate together with the one or more actuators 230, replaced by the actuators 230 on the periphery section 220 or may be omitted.

Figure 5A:
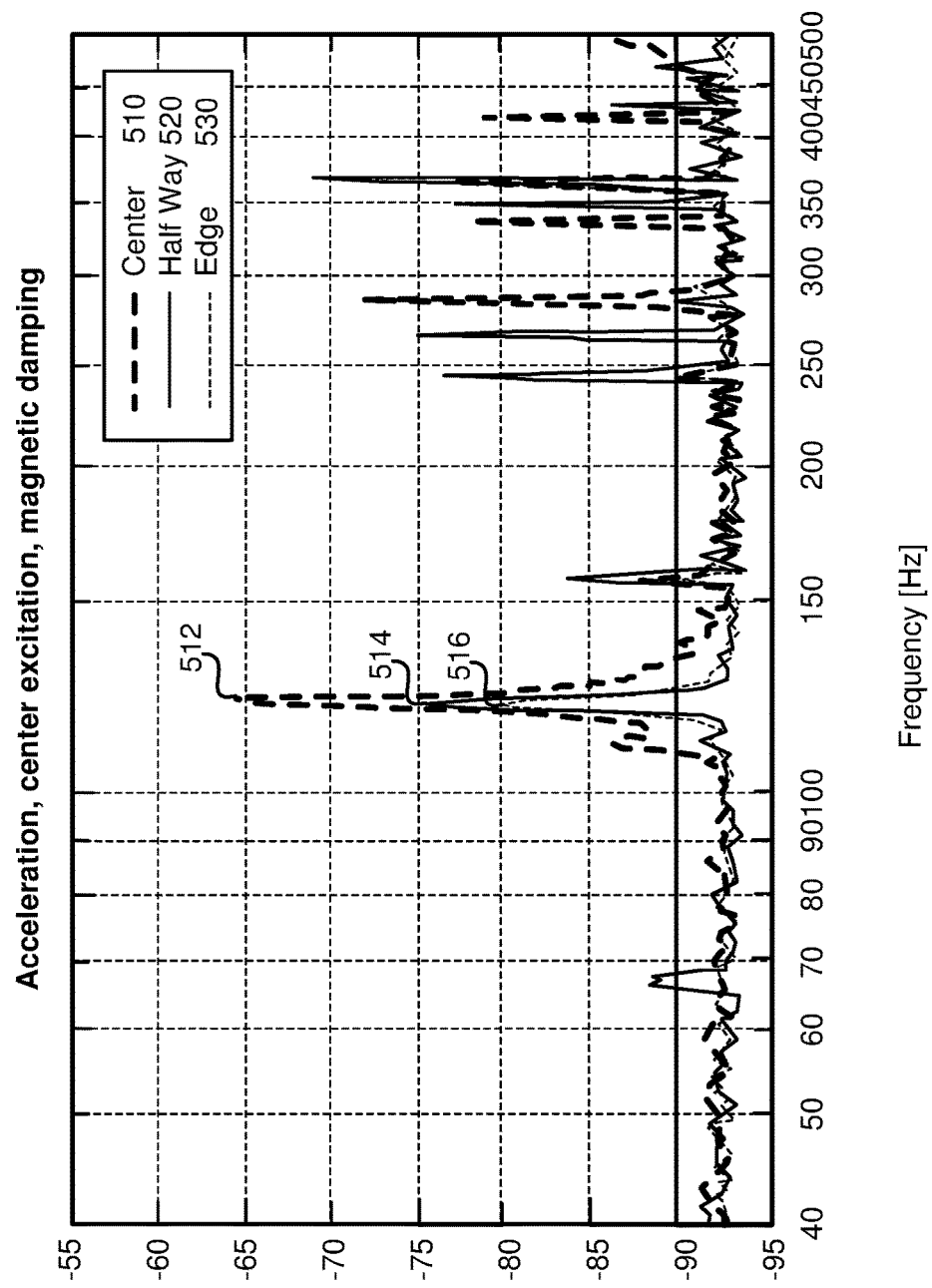
FIG. 5A illustrates haptic feedback detected in response to a reference applied to a haptic mat without damping elements according to an embodiment.

FIG. 5A illustrates haptic feedback detected in response to a reference actuation applied to a haptic mat without damping elements disclosed herein. FIG. 5A includes a number of resonance peaks that occur at different frequencies measured at different locations on a haptic mat, specifically, at a center location 515, an edge location 530, and a halfway location 520. The center location 515 is e.g., a center of the center plate 210 of FIG. 2, the edge location 530 is e.g., the edge 260 of FIG. 2, and the halfway location 520 is halfway between the center location 515 and the edge location 530. The resonance can occur because of constructive interference due to reflections of haptic feedback waves.

Without the damping elements disclosed herein, the response at the center location 510, the edge location 530, and the halfway location 520 includes high resonance peaks at, for example, 125 Hz, and between 250 Hz and 400 Hz. Among different resonance peaks, the resonance peak 512 at 125 Hz at the center location 510 is approximately −65 dB, the resonance peak 514 at 125 Hz at the halfway location 520 is approximately −75 dB, and the resonance peak 516 at 125 Hz at the edge location 530 is approximately −80 dB. Hence, the resonance is most severe at the center location 510 where the user is most likely situated, thus the high resonance at the center location 510 hinders the user perception of haptic feedback. The resonance decreases toward the edge location 530, but the resonance detected at the edge location 530 without the damping elements can still reduce the user perception of haptic feedback.

Figure 5B:
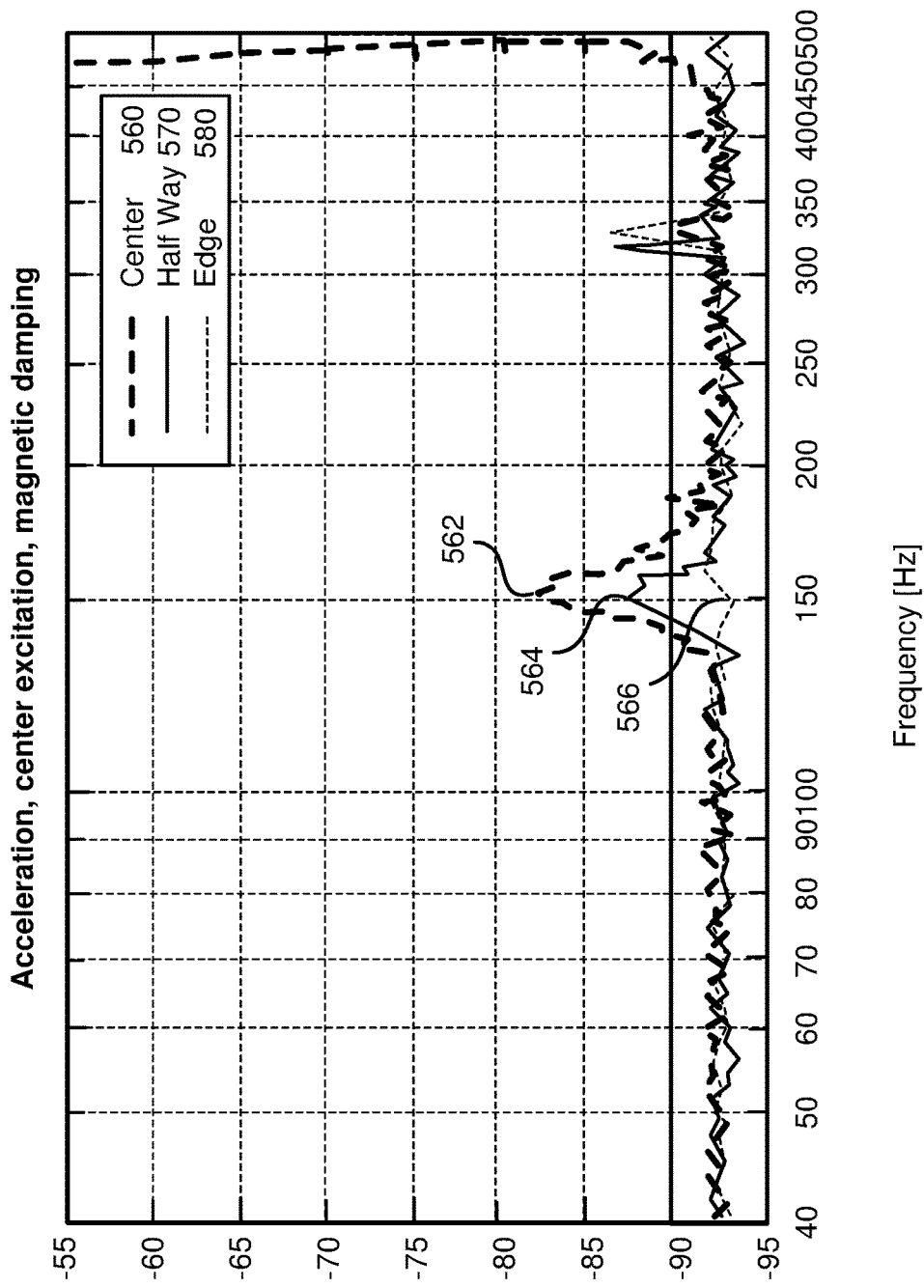
FIG. 5B illustrates haptic feedback detected in response to a reference applied to the haptic mat including damping elements according to an embodiment.

FIG. 5B illustrates haptic feedback suppression described herein in response to the reference actuation applied to a haptic mat. With the damping elements disclosed herein implemented, the response at the center location 560, the edge location 580, and the halfway location 570 (each corresponding to the center location 510, the edge location 530, and the halfway location 520 of FIG. 5A respectively) includes high resonance peaks at, for example, 150 Hz. In FIG. 5B, the resonance peak 562 at 150 Hz at the center location 560 is approximately −83 dB, the resonance peak 564 at 150 Hz at the halfway location 570 is approximately −88 dB, and the resonance peak 566 at 150 Hz at the edge location 530 is approximately −93 dB. Hence, the resonance at the center location 560 with the damping elements is significantly reduced compared to the resonance at the center location 510 without the damping elements. Moreover, the resonance at the edge location 580 is below or equal to the noise floor and is virtually undetectable. Hence, the reflection of a feedback wave on the haptic mat can be effectively suppressed with the damping elements disclosed herein.

Beneficially, by implementing disclosed damping elements including passive damping elements, active damping elements, or a combination of both, the reflection of the haptic feedback wave can be significantly reduced. Accordingly, haptic feedback can be provided from one side of the haptic mat toward a user without reflection, thereby enabling the user to easily determine the haptic feedback and direction of the haptic feedback. Thus, the user can enjoy the immersive virtual reality experience with controlled haptic feedback.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A haptic mat comprising:
   a center plate;
   an actuator coupled to the center plate, the actuator configured to generate a haptic feedback wave directed towards a center of the center plate; and
   a periphery section circumscribing the center plate and comprising a damping element configured to receive the haptic feedback wave exiting the center plate and further configured to suppress the haptic feedback wave to reduce reflections of the haptic feedback wave from the periphery section towards the center of the center plate and converge the haptic feedback wave towards an end of the haptic mat, wherein a first height of a first portion of the periphery section is larger than a second height of a second portion of the periphery section, the first portion closer to the center plate than the second portion.

2. The haptic mat of claim 1, wherein the damping element further comprises a magnetic element configured to suppress the haptic feedback wave.

3. The haptic mat of claim 2, wherein the magnetic element is further configured to suppress the converged haptic feedback wave from the pattern.

4. The haptic mat of claim 1, wherein the haptic mat further comprises a first pattern and a second pattern formed on a surface of the periphery section, a first spacing between two ends of the first pattern and the second pattern larger than a second spacing between other two ends of the first pattern and the second pattern, the two ends of the first pattern and the second pattern closer to the center plate than the other two ends of the first pattern and the second pattern.

5. The haptic mat of claim 1, wherein the damping element recoils in response to the haptic feedback wave.

6. The haptic mat of claim 1, wherein the damping element further comprises a magnetic element and a coil surrounding the magnetic element to press and depress the periphery section to suppress the haptic feedback wave according to a current flowing through the coil.

7. The haptic mat of claim 6, wherein the magnetic element moves in response to the haptic feedback wave, and the movement of the magnetic element induces an eddy current in the coil that causes the magnetic element to move the periphery section in a manner that dampens the haptic feedback wave.

8. The haptic mat of claim 1, further comprising a virtual reality console configured to:
   instruct the actuator to generate the haptic feedback wave;
   predict an expected time value that the haptic feedback wave reaches the damping element; and
   instruct the damping element to dampen the haptic feedback wave based in part on the expected time value.

9. The haptic mat of claim 1, wherein a diameter of the haptic mat is at least 3 feet on which a user can stand.

10. A haptic mat comprising:
    a center plate;
    an actuator coupled to the center plate, the actuator configured to generate a wave directed towards a center of the center plate; and
    a periphery section circumscribing the center plate and comprising, a damping element configured to receive the wave exiting the center plate and further configured to suppress the wave to reduce reflections of the wave from the periphery section toward the center of the center plate and converge the haptic feedback wave towards an end of the haptic mat, wherein a first height of a first portion of the periphery section is larger than a second height of a second portion of the periphery section, the first portion closer to the center plate than the second portion.

11. The haptic mat of claim 10, wherein the damping element further comprises a magnetic element configured to suppress the wave.

12. The haptic mat of claim 11, wherein the magnetic element is further configured to suppress the converged wave from the pattern.

13. The haptic mat of claim 10, wherein the haptic mat further comprises a first pattern and a second pattern formed on a surface of the periphery section, a first spacing between two ends of the first pattern and the second pattern larger than a second spacing between other two ends of the first pattern and the second pattern, the two ends of the first pattern and the second pattern closer to the center plate than the other two ends of the first pattern and the second pattern.

14. The haptic mat of claim 10, wherein the damping element recoils in response to the wave.

15. The haptic mat of claim 10, wherein the damping element further comprises a magnetic element and a coil surrounding the magnetic element to press and depress the periphery section to suppress the wave according to a current flowing through the coil.

16. The haptic mat of claim 15, wherein the magnetic element moves in response to the wave, and the movement of the magnetic element induces an eddy current in the coil that causes the magnetic element to move the periphery section in a manner than dampens the wave.

17. The haptic mat of claim 10, further comprising a console configured to:
   instruct the actuator to generate the wave;
   predict an expected time value that the wave reaches the damping element; and
   instruct the damping element to dampen the wave based in part on the expected time value.

18. The haptic mat of claim 10, wherein a diameter of the haptic mat is less than 18 inches on which a user can place a hand.

* * * * *